US012570221B2

(12) United States Patent
Yoshida et al.

(10) Patent No.: US 12,570,221 B2
(45) Date of Patent: Mar. 10, 2026

(54) PANEL

(71) Applicant: KYORAKU CO., LTD., Kyoto (JP)

(72) Inventors: Kouichiro Yoshida, Chuo-ku (JP); Yosuke Hayashi, Yamato (JP); Takashi Komeno, Yamato (JP); Yuki Harasawa, Yamato (JP); Kentaro Kunimori, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 449 days.

(21) Appl. No.: 18/247,785

(22) PCT Filed: Oct. 12, 2021

(86) PCT No.: PCT/JP2021/037746
§ 371 (c)(1),
(2) Date: Apr. 4, 2023

(87) PCT Pub. No.: WO2022/080369
PCT Pub. Date: Apr. 21, 2022

(65) Prior Publication Data
US 2023/0398953 A1      Dec. 14, 2023

(30) Foreign Application Priority Data

Oct. 15, 2020   (JP) ................................. 2020-174238
Oct. 20, 2020   (JP) ................................. 2020-176226
(Continued)

(51) Int. Cl.
*B60R 13/01*          (2006.01)
*B32B 5/18*           (2006.01)
(Continued)

(52) U.S. Cl.
CPC ............. *B60R 13/011* (2013.01); *B32B 5/18* (2013.01); *B32B 7/022* (2019.01); *B32B 7/12* (2013.01)

(58) Field of Classification Search
CPC ......... B60R 13/011; B32B 7/022; B32B 5/18; B32B 7/12
See application file for complete search history.

(56) References Cited

U.S. PATENT DOCUMENTS 8,895,135 B2 * 11/2014 Nonaka ..................... B32B 3/04
                                                    296/146.7
9,539,958 B2 *  1/2017 Preisler ................. B60R 13/011
(Continued)

FOREIGN PATENT DOCUMENTS

CN          113715418 B  *  2/2023  ........... B29C 70/545
DE     102014016329 B4 * 12/2018  ........... B32B 15/046
(Continued)

OTHER PUBLICATIONS

International Search Report issued on Jan. 11, 2022, in corresponding International Application No. PCT/JP2021/037746; 10 pages.
(Continued)

*Primary Examiner* — Faye M Fleming
(74) *Attorney, Agent, or Firm* — Maier & Maier, PLLC

(57) ABSTRACT

Provided is a panel capable of suppressing delamination of a base material and a surface material. The present invention provides a panel comprising a base material and a surface material, wherein the surface material is fixed inside a recessed part provided on the base material.

11 Claims, 10 Drawing Sheets

(30) Foreign Application Priority Data

| Apr. 15, 2021 | (JP) | ................................ | 2021-069028 |
| Apr. 15, 2021 | (JP) | ................................ | 2021-069029 |
| Sep. 21, 2021 | (JP) | ................................ | 2021-153632 |

(51) Int. Cl.

| B32B 7/022 | (2019.01) |
| B32B 7/12 | (2006.01) |

(56) References Cited

U.S. PATENT DOCUMENTS

| 10,343,380 | B2 * | 7/2019 | Curfman | ................. B32B 29/02 |
| 2008/0261016 | A1 | 10/2008 | Tamada et al. | |
| 2012/0196079 | A1 * | 8/2012 | Brauers | ..................... B32B 3/04 |
| | | | | 428/116 |
| 2015/0086759 | A1 | 3/2015 | Sumi et al. | |
| 2016/0354991 | A1 | 12/2016 | Sueoka | |
| 2018/0079164 | A1 | 3/2018 | Sumi et al. | |
| 2018/0306099 | A1 | 10/2018 | Suzuki et al. | |
| 2019/0283380 | A1 * | 9/2019 | Yamamoto | ............ E04B 2/7405 |
| 2020/0147841 | A1 | 5/2020 | Ishii et al. | |
| 2024/0157878 | A1 * | 5/2024 | Park | ......................... B60R 5/04 |

FOREIGN PATENT DOCUMENTS

| FR | 3037016 | A1 * | 12/2016 | ......... B60R 13/0815 |
| JP | H0645727 | U | 6/1994 | |
| JP | 2003343036 | A | 12/2003 | |
| JP | 2005054338 | A | 3/2005 | |
| JP | 2005271759 | A | 10/2005 | |
| JP | 2007321167 | A | 12/2007 | |
| JP | 2009090522 | A | 4/2009 | |
| JP | 2011168131 | A | 9/2011 | |
| JP | 2012181468 | A | 9/2012 | |
| JP | 2014051150 | A | 3/2014 | |
| JP | 2015164763 | A | 9/2015 | |
| JP | 2016007900 | A | 1/2016 | |
| JP | 2016153166 | A | 8/2016 | |
| JP | 2017078392 | A | 4/2017 | |
| WO | 2006043703 | A1 | 4/2006 | |
| WO | 2013077198 | A1 | 5/2013 | |
| WO | WO-2014123165 | A1 * | 8/2014 | ............ B32B 7/023 |
| WO | 2018141982 | A1 | 8/2018 | |
| WO | 2019026224 | A1 | 2/2019 | |

OTHER PUBLICATIONS

Office Action issued on Dec. 17, 2024, in corresponding Japanese Application No. 2021-069029, 7 pages.

Office Action issued on Feb. 18, 2025, in corresponding Japanese Application No. 2021-153632, 10 pages.

* cited by examiner

Fig. 7

PANEL

TECHNICAL FIELD

The present invention relates to a panel that can be used as a luggage board or the like installed in the luggage compartment of a vehicle.

BACKGROUND ART (First and Third Perspectives)

In Patent Literature 1, disclosed is a panel material configured by attaching a thin plate-shaped steel plate to a hollow plate.

(Second Perspective)

In Patent Literature 2, disclosed is a panel having a plurality of ribs configured by recessing a part of the rear wall toward the front wall and welding the part of the rear wall to an inner surface of the front wall.

(Fourth Perspective)

In Patent Literature 1, disclosed is a panel configured by attaching a thin plate-shaped surface material to a core material.

CITATION LIST

Patent Literature

[Patent Literature 1] JP-A-2016-7900
[Patent Literature 2] WO2013/077198

SUMMARY OF INVENTION

Technical Problem (First Perspective)

In the configuration of Patent Literature 1, the interface between the steel plate and the hollow plate is arranged at a position where external force is easily applied, and delamination of the steel plate and the hollow plate may occur when external force is applied to the interface.

The present invention has been made in view of such a circumstance, and aims to provide a panel capable of suppressing delamination of a base material and a surface material.

(Second Perspective)

The panel of Patent Literature 2 is provided with a bar-shaped reinforcing material inside thereof to increase rigidity. Since the bar-shaped reinforcing material is relatively heavy, the overall weight of the panel is increased by providing the reinforcing material. In addition, since the rib provided on the rear wall are exposed, the panel of Patent Literature 2 does not have excellent designability of the rear surface.

The present invention has been made in view of such circumstances, and aims to provide a panel capable of reducing weight and excellent in designability of the rear surface.

(Third Perspective)

In Patent Literature 1, strength is increased by attaching the steel plate to the hollow plate. However, in some cases, the strength may still be insufficient. To increase the strength, the thickness of the steel plate may be increased. In such a case, however, the weight of the panel is significantly increased.

The present invention has been made in view of such a circumstance, and aims to provide a panel capable of increasing the panel strength while suppressing the significant increase in the panel weight.

(Fourth Perspective)

Although such a panel as disclosed in Patent Literature 1 has excellent strength, the inventors conducted a detailed study of the strength of the panel and found that buckling deformation that the panel is bended when a local load is applied to the surface material is likely to occur.

The present invention has been made in view of such a circumstance, and aims to provide a panel capable of suppressing occurrence of buckling deformation.

Solution to Problem (First Perspective)

According to the present invention, provided is a panel comprising a base material and a surface material, wherein the surface material is fixed inside a recessed part provided on a base material.

In the panel of the present invention, the surface material is fixed inside the recessed part provided on the base material. For this reason, the interface between the base material and the surface material is arranged inside the recessed part, and external force is not applied easily to the interface, thereby suppressing delamination of the base material and the surface material.

Hereinafter, various embodiments of the present invention are exemplified. The embodiments shown below can be combined with each other.

Preferably, the panel described above, wherein the base material and the surface material are covered with a skin material.

Preferably, the panel described above, wherein a width of a periphery between an edge of the recessed part and a side end of the base material is 1 to 20 mm.

Preferably, the panel described above, wherein S/T1 is 0.8 or less, where S represents a step difference between the edge of the recessed part and an edge of the surface material, and T1 represents a thickness of the surface material.

(Second Perspective)

According to the present invention, provided is a panel comprising a base material and a surface material, wherein the base material comprises a front wall and a rear wall, and comprises a rib configured by recessing a part of the rear wall toward the front wall and welding the part of the rear wall to an inner surface of the front wall, and the surface material is fixed to the rear wall to cover an opening of the rib.

Since the surface material is fixed to the rear wall, the panel of the present invention has high rigidity. In addition, since there is no need to provide a reinforcing material inside the panel, it is possible to reduce the weight. Besides, since the surface material covers the opening of the rib on the rear surface of the panel, the rib is not exposed and designability of the rear surface of the panel is excellent.

Hereinafter, various embodiments of the present invention are exemplified. The embodiments shown below can be combined with each other.

Preferably, the panel described above, wherein a recessed part is provided on the rear wall, and the surface material is provided inside the recessed part.

Preferably, the panel described above, wherein a parting line formed on the base material is provided at a position adjacent to an edge on a side of the rear wall of the base material.

(Third Perspective)

According to the present invention, provided is a panel comprising a core material and a surface material, wherein the core material comprises a base material and a reinforcing material, the reinforcing material is configured of a material having strength higher than that of the base material, and each of the base material and the reinforcing material is adhered to the surface material.

In the panel of the present invention, the core material is configured of the base material and the reinforcing material, and the reinforcing material is adhered to the surface material. In such a form, since strength can be increased by arranging the reinforcing material only where strength is needed, the amount of the reinforcing material used can be minimized. For this reason, it is possible to increase the panel strength while suppressing the significant increase in the panel weight.

Hereinafter, various embodiments of the present invention are exemplified. The embodiments shown below can be combined with each other.

Preferably, the panel described above, wherein the base material and the reinforcing material are configured of a foamed body, and a foaming rate of the foamed body configuring the reinforcing material is lower than that of the foamed body configuring the base material.

Preferably, the panel described above, wherein the reinforcing material comprises a column part and a flange part, the flange part is provided at one end or both ends of the column part, and the flange part is adhered to the surface material.

(Fourth Perspective)

According to the present invention, provided is a panel comprising a core material, a first surface material, and a second surface material, wherein the core material is interposed between the first surface material and the second surface material, a thickness of the core material is 15 to 25 mm, the first surface material and the second surface material are adhered to the core material, a first surface material strength index is defined by (a Young's modulus of the first surface material [GPa])×(a thickness of the first surface material [mm])$^2$, a second surface material strength index is defined by (a Young's modulus of the second surface material [GPa])×(a thickness of the second surface material [mm])$^2$, an average surface material strength index is defined as an average value of the first surface material strength index and the second surface material strength index, and a panel strength index defined by (the average surface strength index)×(10% compressive stress of the core material [MPa]) is 0.7 or greater.

The inventors conducted an intensive study and found that buckling deformation occurs by local deformation of the panel when a local load is applied to the panel. Based on this finding, the inventors found that occurrence of buckling deformation can be effectively suppressed by setting the panel strength index, which correlates to the local strength of the panel, to 0.7 or greater, thereby leading to completion of the invention.

Hereinafter, various embodiments of the present invention are exemplified. The embodiments shown below can be combined with each other.

Preferably, the panel described above, wherein the panel strength index is 5.0 or less.

Preferably, the panel described above, wherein an areal density of the panel is 3000 g/m 2 or lower.

BRIEF DESCRIPTION OF DRAWINGS (First Perspective)

(Second Perspective)

Figure 3A:
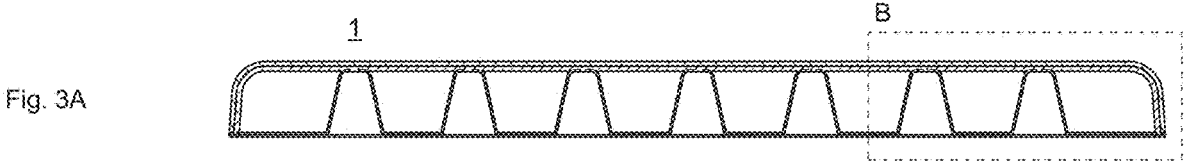

FIG. 3A is a cross-sectional view of a panel 1 of one embodiment of the present invention.

Figure 3B:
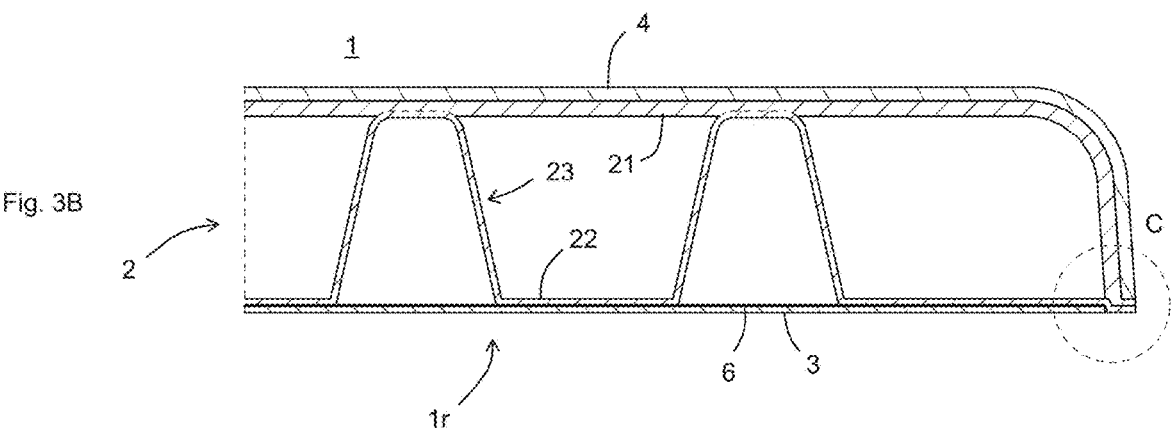

FIG. 3B is an enlarged view of a region B in FIG. 3A.

Figure 3C:
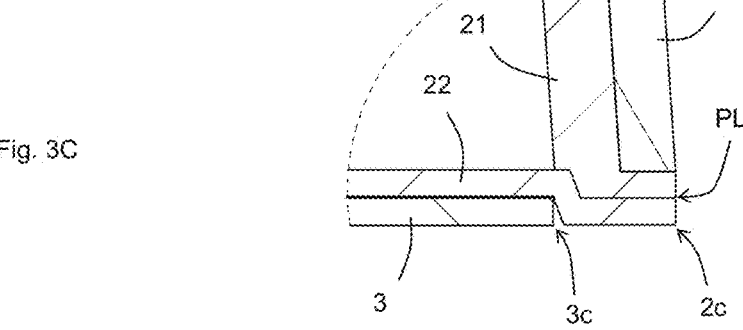

FIG. 3C is an enlarged view of a region C in FIG. 3B.

Figure 4A:
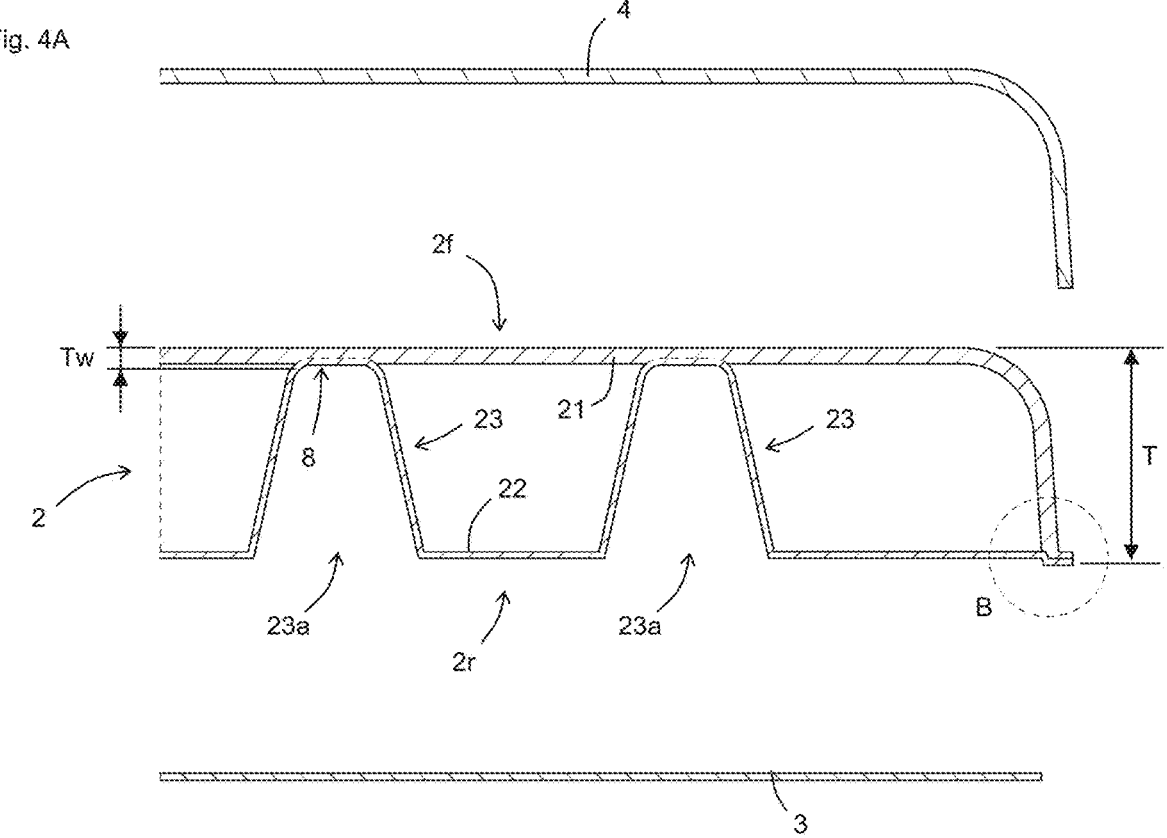

FIG. 4A is an exploded view of FIG. 3B.

Figure 4B:
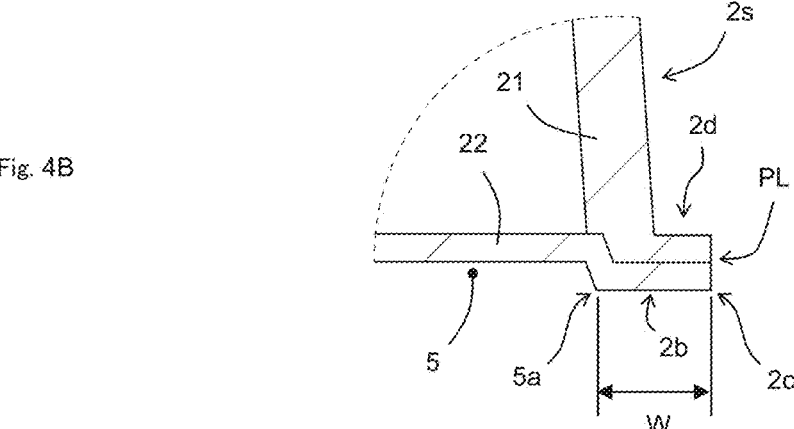

FIG. 4B is an enlarged view of a region B in FIG. 4A.

Figure 5:
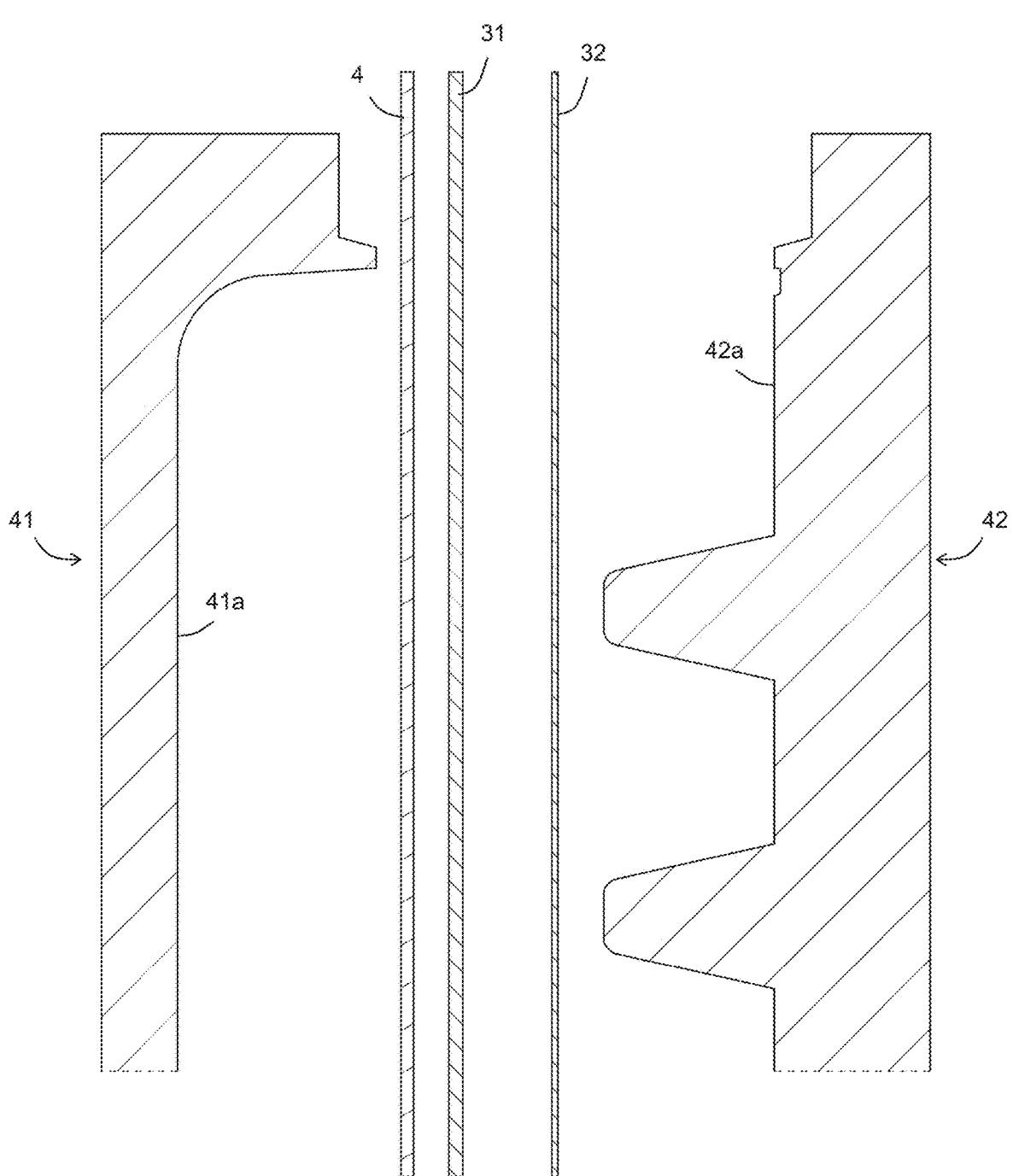

FIG. 5 is a cross-sectional view to explain a step of manufacturing a base material 2 with a skin material 4 welded thereto.

(Third Perspective)

Figure 6A:
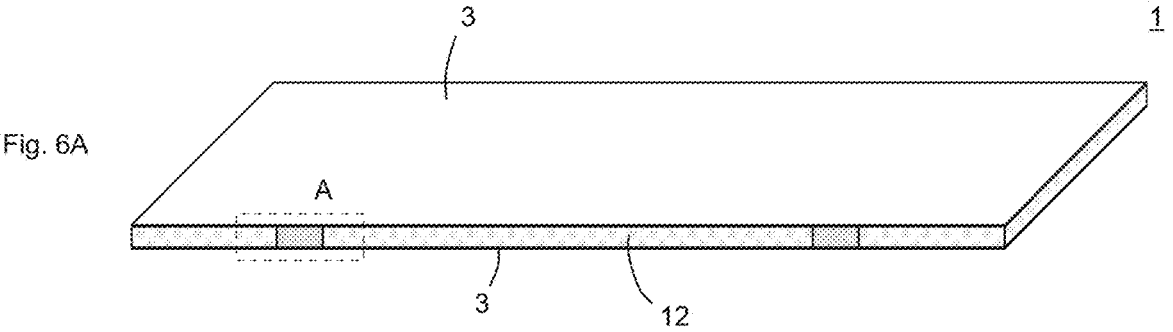

FIG. 6A is a perspective view of a panel 1 of one embodiment of the present invention.

Figure 6B:
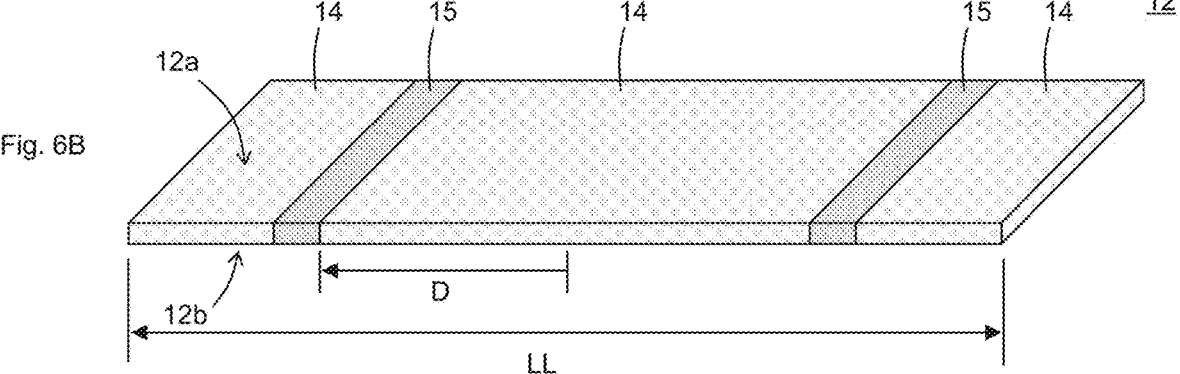

FIG. 6B is a perspective view of a core material 12.

Figure 7:
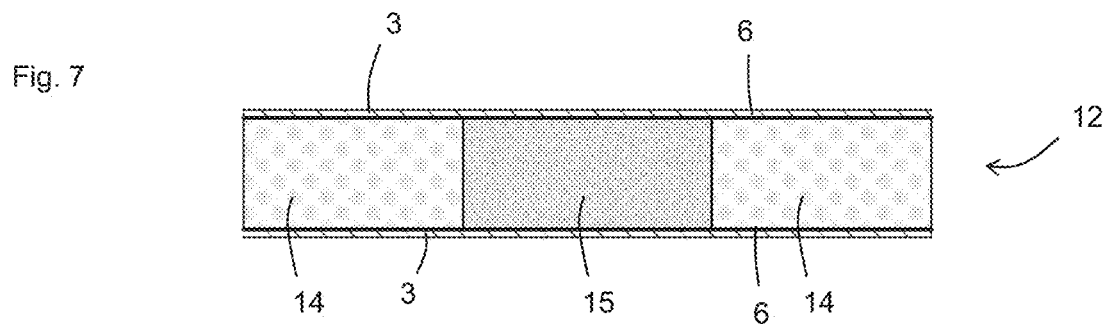

FIG. 7 is an enlarged view of an end surface in a region A in FIG. 6A.

Figure 8:
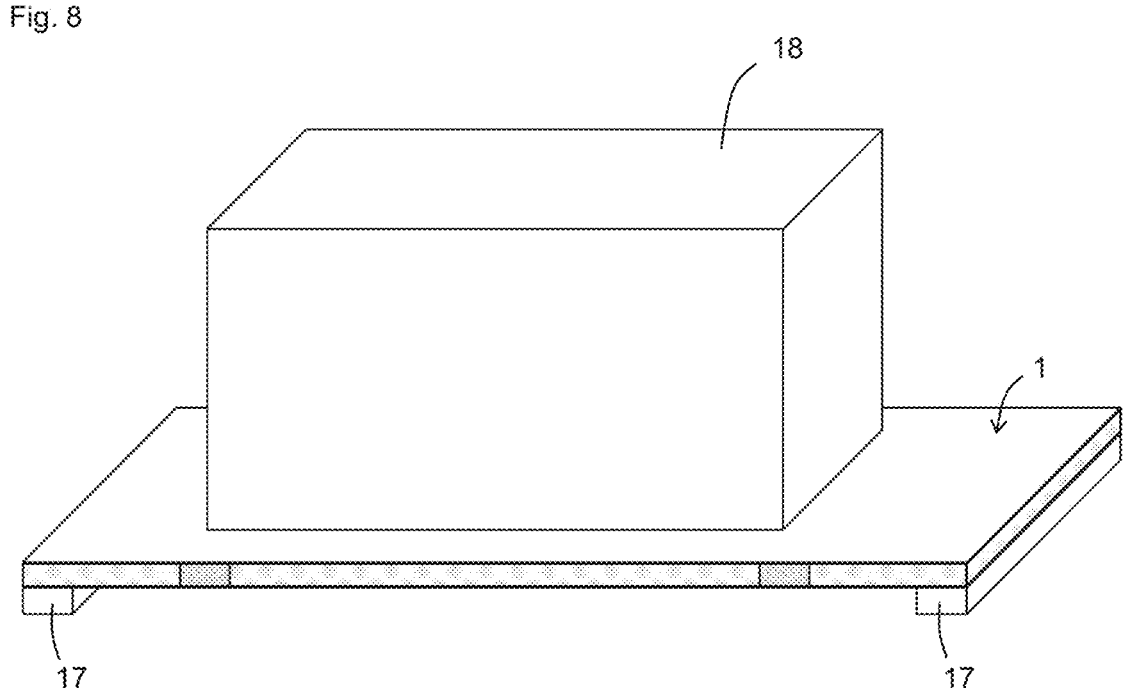

FIG. 8 is a perspective view showing a state in which both ends of a panel 1 in a longitudinal direction are supported by support members 17.

FIGS. 9A to 9D are figures corresponding to FIG. 7, showing the second to fifth embodiments, respectively.

(Fourth Perspective)

Figure 10A:
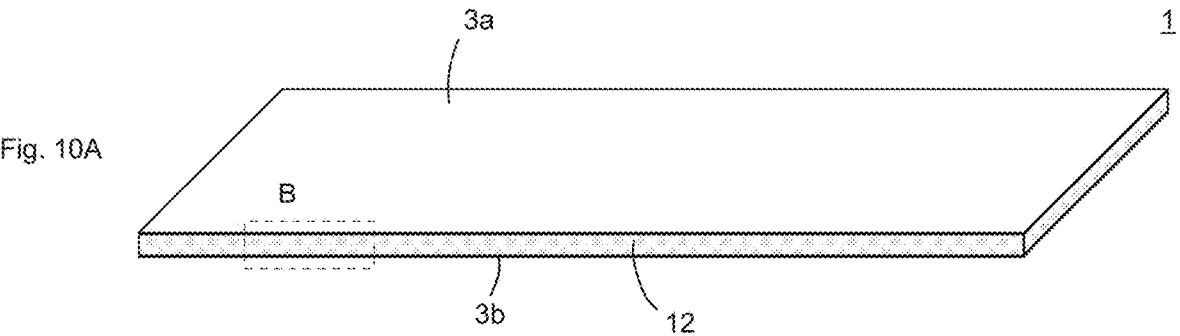

FIG. 10A is a perspective view of a panel 1 of one embodiment of the present invention.

Figure 10B:
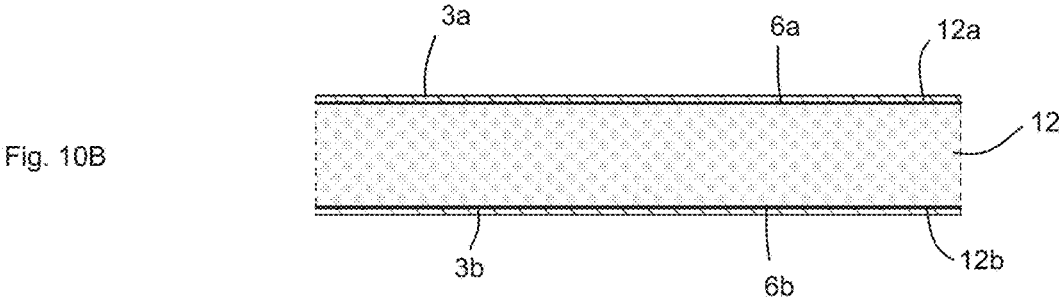

FIG. 10B is an enlarged view of an end surface at a region B in FIG. 10A.

Figure 10C:
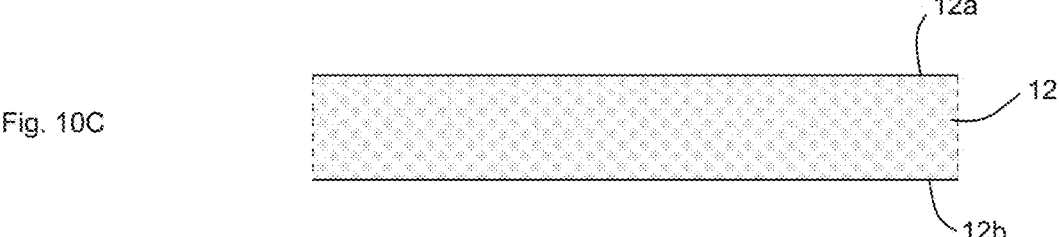

FIG. 10C is a figure showing only a core material 12 extracted from FIG. 10B.

DESCRIPTION OF EMBODIMENTS

Hereinafter, embodiments of the present invention will be described. Various distinctive features shown in the following embodiments can be combined with each other. In addition, the invention can be established independently for each of the distinctive features. The features described in embodiments of the first to fourth perspectives can be combined with each other.

(First Perspective)

1. Structure of Panel 1

Figure 1A:
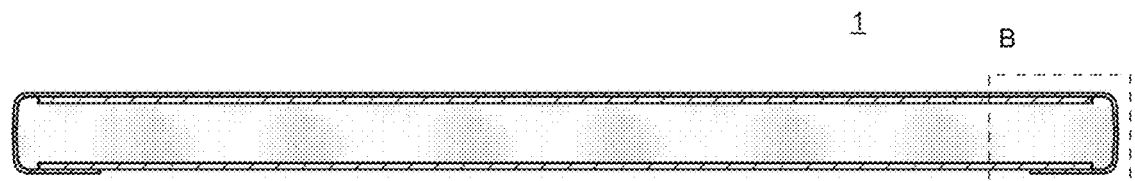
FIG. 1A is a cross-sectional view of a panel 1 of one embodiment of the present invention.
Figure 1B:
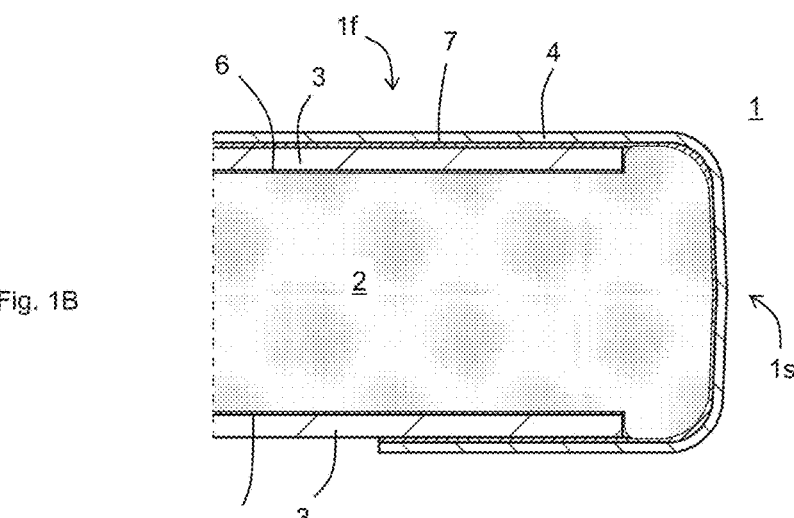
FIG. 1B is an enlarged view of a region B in FIG. 1A.
Figure 1C:
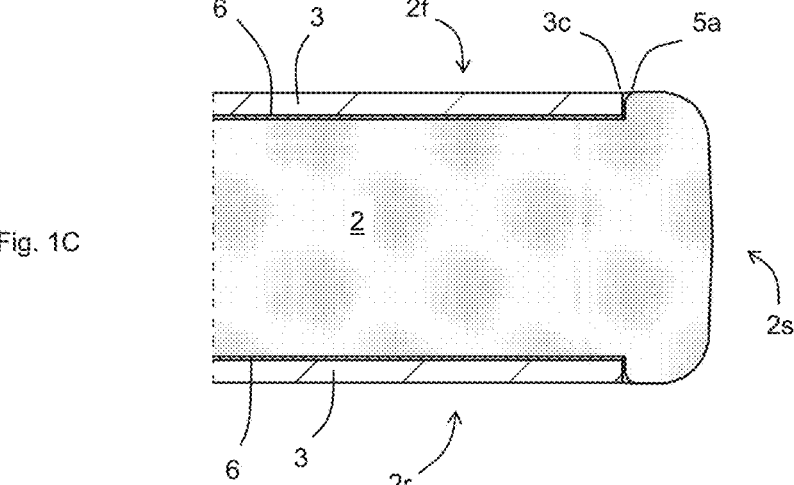
FIG. 1C is a figure showing FIG. 1B without a skin material 4 and an adhesive layer 7.
Figure 2:
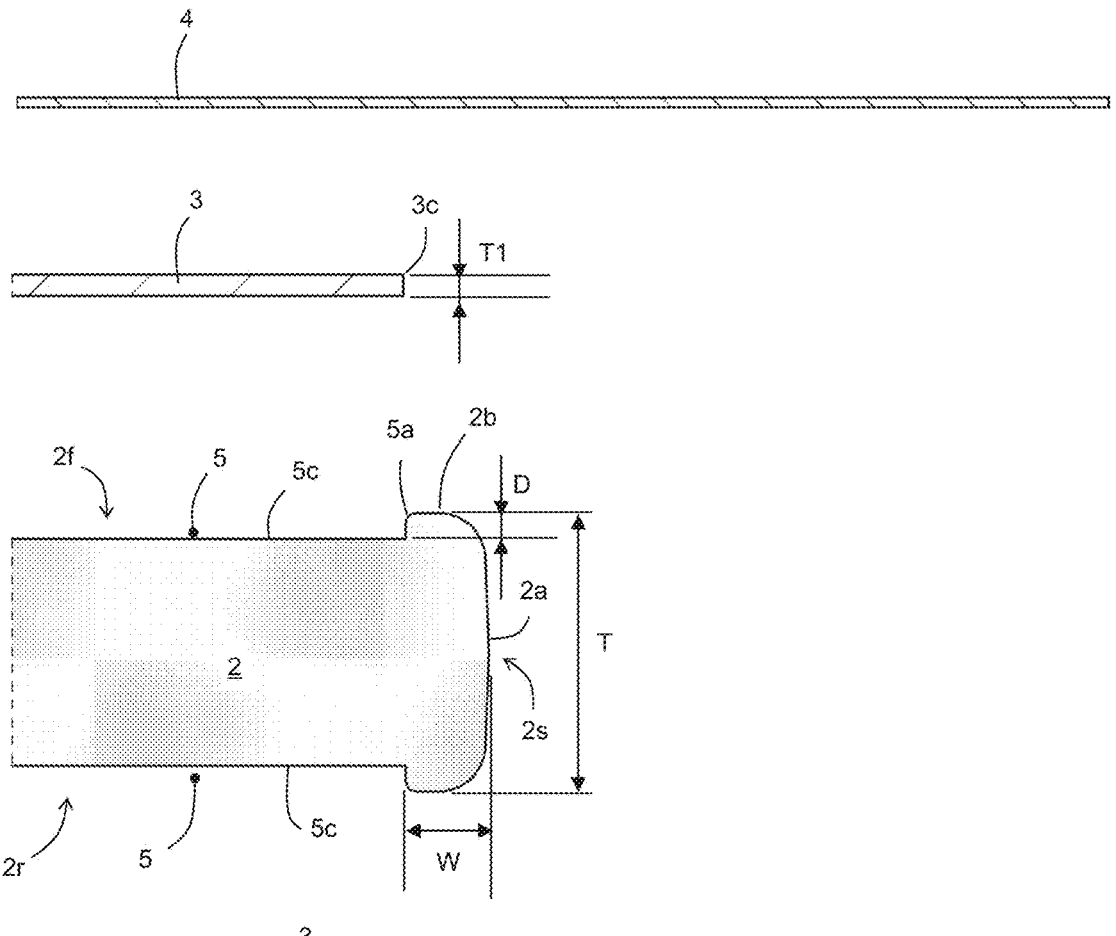
FIG. 2 is an exploded view of FIG. 1B (adhesive layers 6 and 7 are not shown).

As shown in FIGS. 1A to 2, a panel 1 according to one embodiment of the present invention has a base material 2, a surface material 3, and a skin material 4. Preferably, the panel 1 has a substantially rectangular parallelepiped shape. The panel 1 can be used as a luggage board or the like installed in the luggage compartment of a vehicle.

Preferably, the base material 2 is a plate-shaped member. The base material 2 may be a foamed body or a non-foamed body. The base material 2 may also be a hollow body or a solid body. Preferably, the base material 2 is formed by molding with a mold. In this case, since the base material 2 can be made into the desired shape before the panel 1 is manufactured, handleability is excellent. In addition, since the base material 2 can be made into the shape corresponding to the desired panel shape, a shape-optimized product can be obtained.

Examples of the base material 2 include a bead foam molded body obtained by bead foam molding, a foamed or non-foamed sheet molded body obtained by imparting an uneven shape to one foamed or non-foamed resin sheet, and a foamed or non-foamed hollow molded body obtained by molding a tubular parison or two resin sheets which is foamed or non-foamed.

The bead foam molded body can be configured of, for example, a foamed polystyrene, a foamed acrylonitrilestyrene, a foamed polypropylene, or the like. The foaming rate is, for example, to 50 times, specifically for example, 20, 25, 30, 35, 40, or 50 times, and may be in the range between the two values exemplified herein.

The foamed parison or the foamed resin sheet can be configured of a polyolefin such as polyethylene and polypropylene. The foaming rate of the foamed body using this is, for example, 1.1 to 8 times, specifically for example, 1.1, 1.5, 2, 3, 4, 5, 6, 7, or 8 times, and may be in the range between the two values exemplified herein.

The thickness of the base material 2 is, for example, 5 to 25 mm, and preferably 8 to 20 mm. The thickness is, specifically for example, 5, 6, 7, 8, 9, 10, 11, 12, 13, 14, 15, or 25 mm, and may be in the range between the two values exemplified herein. The thickness of the base material 2 represents a distance at a part where the distance between the front surface 2f and the rear surface 2r of the base material 2 is the longest.

The base material 2 is provided with a recessed part 5. Each of the front surface 2f and the rear surface 2r of the base material 2 is provided with one recessed part 5. The surface material 3 is fixed inside each of the recessed parts 5. Preferably, the planar shape of the recessed part 5 (the shape when the base material 2 is viewed from the upper direction in FIG. 1A) is a substantially rectangular shape.

The surface material 3 is a plate-shaped member, and rigidity of the panel 1 can be increased by fixing the surface material 3 inside the recessed part 5. For this reason, the thickness of the base material 2 can be reduced, thereby enabling to reduce the weight of the panel 1. The surface material 3 can be configured of a material having higher rigidity per unit thickness than that of the base material 2. For example, the surface material 3 can be configured of a metal such as aluminum and iron, a fiber reinforced resin, or the like. The thickness of the surface material 3 is, for example, 0.1 to 3 mm, and preferably 0.3 to 1.5 mm. The thickness is, specifically for example, 0.1, 0.2, 0.3, 0.4, 0.5, 0.6, 0.7, 0.8, 0.9, 1.0, 1.5, 2.0, 2.5, or 3.0 mm, and may be in the range between the two values exemplified herein. In the present specification, values such as thickness and depth represent average values, unless otherwise specified.

The method of fixing the surface material 3 inside the recessed part 5 is not particularly limited. The surface material 3 may be welded to the base material 2, or adhered to the base material 2 via an adhesion layer 6. Examples of the adhesive constituting the adhesive layer 6 include urethane-based adhesives and olefin-based adhesives. The thickness of the adhesion layer 6 is, for example, 0.01 to 0.5 mm, specifically for example, 0.01, 0.05, 0.1, 0.2, 0.3, 0.4, or 0.5 mm, and may be in the range between the two values exemplified herein.

If an area of a bottom surface 5c of the recessed part 5 is defined as S1 and an area of a surface of the surface material 3 opposing to the bottom surface 5c of the recessed part 5 is defined as S2, S2/S1 is, for example, 0.8 to 1, and preferably to 1. In this case, almost all of the recessed part 5 is covered by the surface material 3, increasing the rigidity of the panel 1. S2/S1 is, specifically for example, 0.80, 0.81, 0.83, 0.84, 0.85, 0.86, 0.87, 0.88, 0.89, 0.90, 0.91, 0.92, 0.94, 0.95, 0.96, 0.97, 0.98, 0.99, or 1.00, and may be in the range between the two values exemplified herein.

Preferably, the depth of the recessed part 5 is set such that the step difference between the edge 5a of the recessed part 5 and the edge 3c of the surface material 3 is small, and preferably it is set such that no step difference exists. If the step difference exists, the edge 5a may be higher, or the edge 3c may be higher. If the step difference is defined as S and the thickness of the surface material 3 is defined as T1, S/T1 is preferably 0.8 or less. In this case, the step difference is smaller than in the case that the surface material 3 is arranged on the base material 2 without providing the recessed part 5. The value is, for example, 0 to 0.8, specifically for example, 0.1, 0.2, 0.3, 0.4, 0.5, 0.6, 0.7, or 0.8, and may be in the range between the two values exemplified herein. Preferably, the depth of the recessed part 5 is made consistent with the total thickness of the surface material 3 and the adhesion layer 6. In this case, the step difference between the edge 5a of the recessed part 5 and the edge 3c of the surface material 3 can be eliminated.

The depth of the recessed part 5 is, for example, 0.1 to 3 mm, and preferably 0.3 to 1.5 mm. The depth is, specifically for example, 0.1, 0.2, 0.3, 0.4, 0.5, 0.6, 0.7, 0.8, 0.9, 1.0, 1.5, 2.0, 2.5, or 3.0 mm, and may be in the range between the two values exemplified herein.

If the thickness of the base material 2 is defined as T and the depth of the recessed part 5 is defined as D, D/T is, for example, 0.01 to 0.3, and preferably 0.02 to 0.2. The value is, specifically for example, 0.01, 0.02, 0.03, 0.04, 0.05, 0.07, 0.08, 0.09, 0.1, 0.2, or 0.3, and may be in the range between the two values exemplified herein.

Preferably, the width W of a periphery 2b between the edge of the recessed part 5 and a side end 2a of the base material 2 is 1 to 20 mm. When the width W is too small, the strength of the periphery 2b may be too low and the periphery 2b may be destroyed by external force. When the width W is too large, the region where the surface material 3 does not exist may be too large, resulting in insufficient rigidity of the panel 1. The width W is, specifically for example, 1, 2, 3, 4, 5, 6, 7, 8, 9, 10, 11, 12, 13, 14, 15, 16, 17, 18, 19, or 20 mm, and may be in the range between the two values exemplified herein. Preferably, the width W of the periphery 2b is constant over the entire circumference of the base material 2. If the width W is not constant over the entire circumference, preferably the average value thereof is within the range described above, and more preferably both of the minimum and maximum values thereof are within the range described above.

The skin material 4 is arranged to cover the base material 2 and the surface material 3. Preferably, the skin material 4 covers the surface material 3 arranged inside the recessed part of the front surface 2f of the base material 2, the periphery 2b of the front surface 2f of the base material 2, and the side surface 2s of the base material 2. This improves the aesthetic appearance in applications where the front surface if and the side surface is of the panel 1 are easily viewed by the user (e.g., luggage board). In addition, since the interface between the base material 2 and the surface material 3 is covered by the skin material 4, delamination of the surface material 3 from the base material 2 is suppressed. Preferably, the skin material 4 covers a part or all of the surface material 3 arranged inside the recessed part 5 of the rear surface 2r of the base material 2 and the periphery 2b of the rear surface 2r of the base material 2. This suppresses delamination of the surface material 3 on the side of the rear surface 2r from the base material 2 because the interface between the base material 2 and the surface material 3 on the side of the rear surface 2r is covered by the skin material 4.

The skin material 4 is, in one example, a nonwoven fabric, and can be adhered to the surface material 3 and the base material 2 via the adhesive layer 7.

2. Method of Manufacturing Panel 1

The panel 1 can be manufactured by the following method.

(1) Base Material Preparation Step

In the base material preparation step, the base material 2 having the recessed part 5 is prepared.

(2) Surface Material Fixing Step

In the surface material fixing step, the surface material 3 is fixed inside the recessed part 5 of the base material 2. The surface material 3 can be fixed by, for example, welding or adhesion. In the case of adhesion, an adhesion layer is arranged between the base material 2 and the surface material 3, and thereafter the surface material 3 is pressed against the bottom surface 5c of the recessed part 5, thereby enabling to fix the surface material 3 to the bottom surface 5c of the recessed part 5. The adhesion layer can be arranged by applying an adhesive to the bottom surface 5c of the recessed part 5 or the surface material 3 (e.g., spray coating and bead coating).

(3) Skin Material Fixing Step

In the skin material fixing step, an adhesive is applied to the part to fix the skin material 4 (the surface material 3 and the base material 2), and then the skin material 4 is pressed against the part to which the adhesive is applied, thereby enabling to fixing the skin material 4 to the surface material 3 and the base material 2.

3. Other Methods of Manufacturing Panel 1

In "2. Method For Manufacturing Panel 1," the base material 2 having the recessed part 5 was prepared and then the surface material 3 was fixed inside the recessed part 5. The recessed part 5 may be formed on the base material 2 by preparing the base material 2 not having the recessed part 5 and by pressing the surface material 3 against the base material 2 with the surface material 3 placed on the base material 2 to sink the surface material 3 into the base material 2. The surface material 3 can also be fixed inside the recessed part 5 by such a method. In this case, the base material 2 is preferably configured of a material that is easily recessed by pressing (e.g., a foam, especially a bead foam molded body).

The step of pressing the surface material 3 against base material 2 may be performed with or without an adhesive layer arranged between the base material 2 and the surface material 3. In the latter case, the surface material 3 can be fixed to the base material 2 by pressing the surface material 3 against the base material 2 to form the recessed part 5, and then pressing the surface material 3 against the base material 2 with the adhesive layer arranged between the base material 2 and the surface material 3. The former is preferable because the number of steps is small. The pressing can be performed using, for example, a pressing roller, a pressing machine, or the like.

In this manufacturing method, the skin material fixing step can be performed similarly to "2. Method of Manufacturing Panel 1".

4. Other Embodiments

The skin material 4 can be omitted if unnecessary.

The recessed part 5 may be provided only on one of the front surface 2f and the rear surface 2r of the base material 2. In this case, the surface material 3 is arranged only on the surface where the recessed part 5 exists.

(Second Perspective)

1. Structure of Panel 1

As shown in FIGS. 3A and 4B, a panel 1 according to one embodiment of the present invention has a base material 2, a surface material 3, and a skin material 4. Preferably, the panel 1 has a substantially rectangular parallelepiped shape. The panel 1 can be used as a luggage board or the like installed in the luggage compartment of a vehicle.

The base material 2 comprises a front wall 21 and a rear wall 22, and comprises a rib 23 configured by recessing a part of the rear wall 22 toward the front wall 21 and welding the part of the rear wall 22 to an inner surface of the front wall 21.

The front wall 21 and the rear wall 22 can be configured of a resin composition. The resin composition contains a resin and may contain an additive such as a filler. Examples of the resin include olefin resins such as polyethylene and polypropylene. Examples of the filler include fibrous fillers such as glass fibers and carbon fibers, and particle fillers such as talc and mica. The addition of the filler can increase the rigidity and decrease the linear expansion coefficient. When the total of the resin and the filler is 100 mass %, the filler content is, for example, 20 to 50 mass %, and preferably 30 to mass %. The content is, for example, 20, 25, 30, 35, 40, 45, or 50 mass %, and may be in the range between the two values exemplified herein.

The filler content of the rear wall 22 is preferably lower than that of the front wall 21. In this case, the rigidity of the panel 1 on the side of the rear wall 22 is low, but it can be increased by providing the surface material 3. For this reason, the panel 1 that is particularly lightweight and highly rigid can be obtained by making the filler content of the rear wall 22 lower than that of the front wall 21 and reinforcing the rear wall 22 with the surface material 3.

Each of the wall thicknesses of the front wall 21 and the rear wall 22 at parts other than the rib 23 is, for example, 0.5 to 2.0 mm, and preferably 0.8 to 1.5 mm. The thicknesses are, for example, 0.5, 0.6, 0.7, 0.8, 0.9, 1.0, 1.1, 1.2, 1.3, 1.4, 1.5, 1.6, 1.7, 1.8, 1.9, or 2.0 mm, and may be in the range between the two values exemplified herein. In the present specification, values such as wall thickness, thickness, and depth represent average values, unless otherwise specified.

The wall thickness of the rear wall 22 is preferably smaller than that of the front wall 21. In this case, the weight of the panel 1 can be reduced while increasing the rigidity of the panel 1 on the side of the front wall 21. In addition, the rigidity of the panel 1 on the side of the rear surface 22 can be increased by providing the surface material 3. For this reason, the panel 1 that is particularly lightweight and highly rigid can be obtained by making the wall thickness of the rear wall 22 smaller than that of the front wall 21 and reinforcing the rear wall 22 with the surface material 3. If the wall thickness of the rear wall 22 is defined as Tr and the wall thickness of the front wall 21 is defined as Tf, Tr/Tf is, for example, 0.1 to 0.9, and preferably 0.3 to 0.7. Tr/Tf is, for example, 0.1, 0.3, 0.4, 0.5, 0.6, 0.7, 0.8, or 0.9, and may be in the range between the two values exemplified herein.

The front wall 21 and the rear wall 22 may be foamed or non-foamed. The foaming rate of the rear wall 22 is preferably higher than that of the front wall 21. In this case, the rigidity of the panel 1 on the side of the rear wall 22 is low, but it can be increased by providing the surface material 3. For this reason, the panel 1 that is particularly lightweight and highly rigid can be obtained by making the foaming rate of the rear wall 22 higher than that of the front wall 21 and reinforcing the rear wall 22 with the surface material 3.

The opening shape of the rib 23 is not particularly limited and may be a circular shape, an elliptic shape, a rectangular shape, a polygonal shape, or the like. The bottom part of the rib 23 is a welded part 8 at which the front wall 21 and the rear wall 22 are welded together. At the welded part 8, the front wall 21 and the rear wall 22 are preferably compressed, and the wall thickness of the welded part 8 is preferably smaller than the total of the wall thicknesses of the front wall 21 and the rear wall 22. If the wall thickness of the welded part 8 is defined as Tw, Tw/(Tf/Tr) is, for example, 0.5 to 0.95, for example, 0.50, 0.55, 0.60, 0.65, 0.70, 0.75, 0.80, 0.85, 0.90, or 0.95, and may be in the range between the two values exemplified herein. In addition, Tw/Tf is, for example, 0.8 to 1.2, for example, 0.80, 0.85, 0.90, 0.95, 1.00, 1.05, 1.10, 1.15, or 1.20, and may be in the range between the two values exemplified herein.

Preferably, the base material 2 is provided with a plurality of ribs 23. Preferably, the plurality of ribs 23 are arranged regularly and dispersedly. In this case, the rigidity of the panel 1 is particularly high.

The thickness T of the thickest part of the base material 2 is, for example, 5 to 25 mm, and preferably 8 to 20 mm. The thickness is, specifically for example, 5, 6, 7, 8, 9, 10, 11, 12, 13, 14, 15, 20, or 25 mm, and may be in the range between the two values exemplified herein.

In one example, the base material 2 can be formed by molding a pair of resin sheets 31 and 32 using a pair of molds 41 and 42, as shown in FIG. 5. A parting line PL is formed on the base material 2 at a position corresponding to the parting surface of the molds 41 and 42. The front wall 21 and the rear wall 22 are welded at the parting line PL. The parting line PL formed on the base material 2 is preferably provided at the position adjacent to the edge 2c on the side of the rear wall 22 in a thickness direction of the base material 2. The advantages of providing the parting line PL at this position are that the parting line PL is inconspicuous and excellent in aesthetic appearance, and that the user is restrained from touching the parting line PL and feeling a sense of harm. In addition, in the case that the skin material 4 is integrally molded, although the skin material 4 arranged on the side of the front wall 21 is supposed to cover the region leading to the position of the parting line PL, almost the entire side surface 2s of the base material 2 is covered with the skin material 4 by providing the parting line PL at the position adjacent to the edge 2c, thereby leading to the advantage of excellent aesthetical appearance.

In addition, the edge 2c is preferably provided at the protruding part 2d that protrudes from the side surface 2s of the base material 2. The welded width of the front wall 21 and the rear wall 22 is increased by providing the protruding part 2d and the strength of the parting line PL is improved.

The surface material 3 is a plate-shaped member, and is fixed on the rear wall 22 to cover the opening 23a of the rib 23. This can increase the rigidity of the panel 1. For this reason, it becomes unnecessary to provide the bar-shaped reinforcing material in the panel 1, thereby enabling to reduce the weight of the panel 1. In addition, designability of the rear surface 1r of the panel 1 can be enhanced by covering the opening 23a of the rib 23 by the surface material 3. The surface material 3 covers the opening 23a of at least one of the ribs 23 provided on the rear wall 22. It preferably covers the openings 23a of the plurality of the ribs 23, and more preferably covers the openings 23a of all the ribs 23. Descriptions of the material, thickness, and the like of the surface material 3 are the same as those in the first perspective.

The method of fixing the surface material 3 to the rear wall 22 is the same as the method of fixing the surface material 3 inside the recessed part 5 in the first perspective.

Preferably, the recessed part 5 is provided on the rear wall 22 and the surface material 3 is provided inside the recessed part 5. Owing to this, the interface between the rear wall 22 and the surface material 3 is arranged inside the recessed part 5, and thus external force is not likely to be applied, thereby suppressing delamination of the rear wall 22 and the surface material 3. The recessed part 5 is preferably provided in the area including the plurality of ribs 23. Preferably, the planar shape of the outer circumference of the recessed part 5 (the shape when the base material 2 is viewed from the lower direction in FIG. 4A) is a substantially rectangular shape.

If the area of the region encompassed by the outer circumference of the recessed part 5 is defined as S1 and the area of the surface of the surface material 3 opposing to the recessed part 5 is defined as S2, descriptions of S2/S1 are the same as those of S2/S1 in the first perspective.

Descriptions of the depth of the recessed part 5 are the same as those of the recessed part 5 in the first perspective.

If the thickness of the thickest part of the base material 2 is defined as T and the depth of the recessed part 5 is defined as D, descriptions of D/T are the same as those in the first perspective.

Descriptions of the width W of the periphery 2b between the edge 5a of the recessed part 5 and the edge 2c on the side of rear wall 22 of the base material 2 are the same as those in the first perspective.

Preferably, the skin material 4 is arranged to cover the front surface 2f and the side surface 2s of the base material 2, thereby enabling to improve the designability of the front surface 2f and the side surface 2s. The skin material 4 may cover the base material 2 and the surface material 3 on the rear surface 2r of the base material 2. In one example, the skin material 4 is a nonwoven fabric. The skin material 4 can be omitted if unnecessary.

2. Method of Manufacturing Panel 1

The panel 1 can be manufactured by the following method.

(1) Base Material Preparation Step

In one example, in the base material preparation step, a pair of resin sheets 31 and 32 in a molten state can be molded using a pair of openable/closable molds 41 and 42, as shown in FIG. 5. The resin sheets 31 and 32 become the front wall 21 and the rear wall 22, respectively. By arranging the skin material 4 between the mold 41 and the resin sheet 31, the skin material 4 can be welded to the front wall 21 (i.e., integrally molded) when manufacturing the base material 2. The resin sheets 31 and 32 can be formed by extruding the resin composition from a T-die.

In one example, the base material 2 with the skin material 4 welded thereto can be obtained by vacuum-suctioning the resin sheets 31 and 32 with the molds 41 and 42, then forming the resin sheets 31 and 32 into the shapes of the molding surfaces 41a and 42a of the molds 41 and 42, respectively, and thereafter closing the molds 41 and 42.

The skin material 4 may be welded or adhered to the base material after the base material 2 is manufactured, without arranging the skin material 4 between the mold 41 and the resin sheet 31.

(2) Surface Material Fixing Step

In the surface material fixing step, the surface material 3 is fixed to the rear wall 22. The surface material 3 can be fixed by welding or adhesion, for example. In the case of adhesion, the surface 3 can be fixed to the rear wall 22 by applying an adhesive to the rear wall 22 (e.g., spray coating, bead coating) and then pressing the surface material 3 against the rear wall 22.

(Third Perspective)

1. First Embodiment 1-1. Structure of Panel 1

As shown in FIGS. 6A to 7, the panel 1 according to one embodiment of the present invention has a core material 12 and a surface material 3. Preferably, the panel 1 has a substantially rectangular parallelepiped shape. The panel 1 can be used as a luggage board or the like installed in the luggage compartment of a vehicle.

The core material 12 is preferably a plate-shaped member. The thickness of the core material 12 is, for example, 5 to 25 mm, and preferably 8 to 20 mm. The thickness is, specifically for example, 5, 6, 7, 8, 9, 10, 11, 12, 13, 14, 15, 20, or 25 mm, and may be in the range between the two values exemplified herein. The thickness of the core material 12 represents a distance at a part where the distance between a first major surface 12a and a second major surface 12b of the core material 12 opposing to each other is the longest. The core material 12 is preferably provided with a recessed part, and the surface material 3 is fixed inside the recessed part, which suppresses delamination of the surface material 3 from the core material 12. The core material 12 has a base material 14 and a reinforcing material 15.

Descriptions of the base material 14 are the same as those of the base material 2 in the first perspective.

The reinforcing material 15 is configured of a material having strength higher than that of the base material 14. Examples of the reinforcing material 15 include a metal, a wood, and a resin. The resin may be a foamed body or a non-foamed body. In the present specification, "strength" represents a Young's modulus at 25° C. The value of {strength of the reinforcing material 15/strength of the base material 14} is, for example, 1.1 or greater, preferably 1.5 or greater, and preferably 2 or greater. The value is, for example, 1.1 to 1000, specifically for example, 1.1, 1.5, 2, 3, 4, 5, 6, 7, 8, 9, 10, 20, 50, 100, or 1000, and may be in the range between the two values exemplified herein.

In the present embodiment, the base material 14 and the reinforcing material 15 are formed of a foamed body, and the foaming rate of the reinforcing material 15 is lower than that of the base material 14. Since strength of a foamed body is higher as the foaming rate is lower, the strength of the reinforcing material 15 can be made higher than that of the base material 14 by making the foaming rate of the reinforcing material 15 lower than that of the base material 14. Preferably, the base material 14 and the reinforcing material 15 are configured of the same resin. In this case, since the base material 14 and the reinforcing material 15 are easily welded together, the base material 14 and the reinforcing material 15 are easily integrated by insert molding, for example. If the foaming rate of the reinforcing material 15 is defined as M1 and the foaming rate of the base material 14 is defined as M2, M1/M2 is, for example, 0.1 to 0.9, specifically for example, 0.1, 0.2, 0.4, 0.5, 0.6, 0.7, 0.8, or 0.9, and may be in the range between the two values exemplified herein.

The specific gravity of the reinforcing material 15 is normally greater than that of the base material 14. The value of {the specific gravity of the reinforcing material 15/the specific gravity of the base material 14} is, for example, 1.1 or greater. The value is, for example, 1.1 to 1000, specifically for example, 1.1, 1.5, 2, 3, 4, 5, 6, 7, 8, 9, 10, 20, 50, 100, or 1000, and may be in the range between the two values exemplified herein.

The reinforcing material 15 is preferably an elongated member. If the length in the longitudinal direction is defined as L and the diameter of the circumscribed circle at the part where the diameter of the circumscribed circle is the largest in the cross-section perpendicular to the longitudinal direction is defined as D, L/D is preferably 5 or greater, more preferably or greater, and even more preferably 20 or greater. L/D is, for example, 5 to 1000, specifically for example, 5, 10, 15, 20, 100, or 1000, and may be in the range between the two values exemplified herein. Preferably, the cross-sectional shape of the reinforcing material 15 is constant along the longitudinal direction.

The reinforcing material 15 can be provided at an arbitrary position in the core material 12 and provided in an arbitrary size. However, since the specific gravity of the reinforcing material 15 is usually greater than that of the base material 14, the amount of the reinforcing material 15 used is preferably minimized to suppress the increase in weight. If the volume of the core material 12 is defined as V1 and the volume of the reinforcing material 15 is defined as V2, V2/V1 is preferably or less, and more preferably 0.3 or less. V2/V1 is, for example, 0.001 to 0.5, specifically for example, 0.001, 0.01, 0.2, 0.3, 0.4, or 0.5, and may be in the range between the two values exemplified herein. If the weight of the core material 12 is defined as W1 and the weight of the reinforcing material is defined as W2, W2/W1 is preferably 0.8 or less, more preferably 0.5 or less, and even more preferably 0.3 or less. W2/W1 is, for example, 0.001 to 0.8, specifically for example, 0.01, 0.1, 0.2, 0.3, 0.4, 0.5, 0.6, 0.7, or 0.8, and may be in the range between the two values exemplified herein.

In one example, the reinforcing material 15 is arranged such that the longitudinal direction of the reinforcing material is along the longitudinal or lateral direction of the core material 12. If the length of the core material 12 along the longitudinal direction of the reinforcing material 15 is defined as LC and the length of the reinforcing material 15 in the longitudinal direction is defined as L, L/LC is preferably 0.5 or greater, and preferably 0.8 or greater. In this case, the strength of the panel 1 can be increased over a wide area of the panel 1. L/LC is, for example, 0.5 to 1.0, specifically for example, 0.5, 0.6, 0.7, 0.8, 0.9, or 1.0, and may be in the range between the two values exemplified herein.

The ratio of the thickness of the reinforcing material 15 to the thickness of the core material 12 is, for example, 0.1 to 1.0, specifically for example, 0.1, 0.2, 0.3, 0.4, 0.5, 0.6, 0.8, 0.9, or 1.0, and may be in the range between the two values exemplified herein.

The length of the core material in the lateral direction (the length in a direction perpendicular to both the longitudinal direction and the thickness direction) is, for example, 10 to 100 mm, and preferably 20 to 40 mm. The length is, specifically for example, 10, 20, 30, 40, 50, 60, 70, 80, or 100 mm, and may be in the range between the two values exemplified herein.

In one example, if the length of the core material 12 in the longitudinal direction is defined as LL and the distance of the reinforcing material 15 from the center of the core material 12 in the longitudinal direction is defined as D, the reinforcing material 15 is preferably arranged at the position where D/LL becomes 0.20 to 0.45 such that the longitudinal direction of the reinforcing material 15 is along the lateral direction of the core material 12. As shown in FIG. 8, if a relatively large luggage 18 is placed near the center of the longitudinal direction of the panel 1 while both ends of the longitudinal direction of the panel 1 are supported by the support member 17, the panel 1 tends to buckle at the position where D/LL becomes to 0.45. Therefore, the buckling of the panel 1 can be suppressed by providing the reinforcing material 15 at such a position. D/LL is, specifically for example, 0.20, 0.25, 0.30, 0.40, or 0.45, and may be in the range between the two values exemplified herein.

The reinforcing material 15 may be provided throughout the entire thickness of the core material 12, or only in a part in the thickness direction. The reinforcing material 15 may be exposed on only one side of the core material 12 or on both sides of the core material 12.

On the surface where the reinforcing material 15 is exposed, the base material 14 and the reinforcing material 15 is preferably flush with each other. This makes it easy to adhere the base material 14 and the reinforcing material 15 to the surface material 3.

The surface material 3 is a plate-shaped member and is fixed to the core material 12 by being adhered to the base material 14 and the reinforcing material 15. By adhering the surface material 3 to the reinforcing material 15 as well as the base material 14, the surface material 3 and the reinforcing material 15 are integrated, by which the reinforcing effect due to providing the reinforcing material 15 becomes prominent and an abnormal noise generated by the reinforcing material 15 interfering with other members during vibration is suppressed. The surface material 3 can be configured of a material having the strength per unit thickness higher than that of the base material 14. Descriptions of the material, thickness, and the like of the surface material 3 are the same as those in the first perspective.

The method of adhering the surface material 3 to the base material 14 and the reinforcing material 15 via the adhesive layer 6 is the same as the method of fixing the surface material 3 inside the recessed part 5 in the first perspective.

The surface material 3 may be provided on only one of the first major surface 12a and the second major surface 12b of the core material 12, or on both the first major surface 12a and the second major surface 12b.

1-2. Method of Manufacturing Panel 1

The panel 1 can be manufactured by the following method.

(1) Core Material Preparation Step

In the core material preparation step, the core material 12 is prepared. The core material 12 can be formed by insert molding in which the reinforcing material 15 is inserted during molding of the base material 14, or by preparing the base material 14 and the reinforcing material 15 separately and then joining (fitting, gluing, welding, etc.) both.

(2) Surface Material Fixing Step

In the surface material fixing step, each of the base material 14 and the reinforcing material 15 is adhered to the surface material 3. This adhesion can be performed by applying an adhesive onto the base material 14 and the reinforcing material 15 (e.g., spray coating, bead coating) and then pressing the surface material 3 against the base material 14 and the reinforcing material 15.

2. Second Embodiment

Figures 9A, 9B, 9C, 9D:
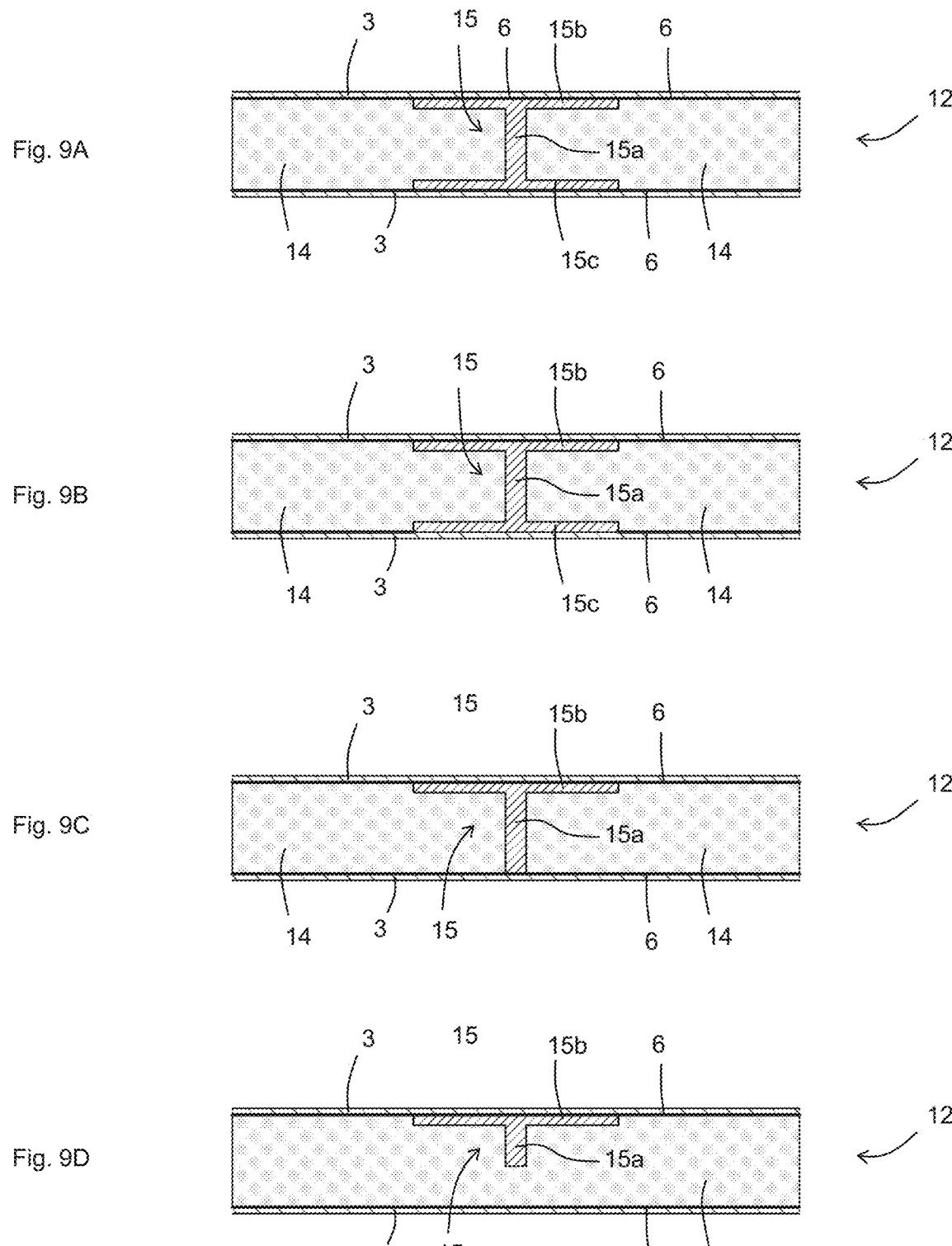

The second embodiment of the present invention will be described with reference to FIG. 9A. The present embodiment is similar to the first embodiment, and the main difference is the configuration of the reinforcing material 15. Hereinafter, the difference will mainly be described.

In the present embodiment, the reinforcing material 15 is H-shaped. The reinforcing material 15 has a column part 15a and flange parts 15b and 15c at both ends of the column part 15a, both the flange parts 15b and 15c adhered to the surface material 3.

Since the H-shaped reinforcing material 15 has a high strength improving effect per volume, the strength of the panel 1 can be significantly increased by using the reinforcing material having such a shape. In addition, in the present embodiment, since each of the flange parts 15b and 15c is adhered to the surface material 3, the strength improving effect is more prominent.

The thicknesses of the flange parts 15b and 15c are, for example, 0.5 to 5 mm, and preferably 1 to 3 mm. The thicknesses are, specifically for example, 0.5, 1.0, 1.5, 2.0, 2.5, 3.0, 3.5, 4.0, 4.5, or 5.0 mm, and may be in the range between the two values exemplified herein.

3. Third Embodiment

The third embodiment of the present invention will be described with reference to FIG. 9B. The present embodiment is similar to the second embodiment, and the main difference is a form in which the reinforcing material 15 is adhered to the surface material 3. Hereinafter, the difference will mainly be described.

In the present embodiment, the configuration of the reinforcing material 15 is the same as that in the second embodiment. However, only the flange part 15b is adhered to the surface material 3 and the flange part 15c is not adhered to the surface material 3. Effects of strength improvement and noise suppression are achieved even in such a form.

4. Fourth Embodiment

The fourth embodiment of the present invention will be described with reference to FIG. 9C. The present embodiment is similar to the third embodiment, and the main difference is the configuration of the reinforcing material 15. Hereinafter, the difference will mainly be described.

In the present embodiment, the reinforcing material 15 has the flange part 15b at one end of the column part 15a, and no flange part is provided at the other end of the column part 15a. The flange part 15b is adhered to the surface material 3. The other end of the column part 15a may or may not be adhered to the surface material. Effects of strength improvement and noise suppression are achieved even in such a form.

5. Fifth Embodiment

The fifth embodiment of the present invention will be described with reference to FIG. 9D. The present embodiment is similar to the fourth embodiment, and the main difference is the configuration of the reinforcing material 15. Hereinafter, the difference will mainly be described.

In the present embodiment, the reinforcing material 15 has the flange part 15b at one end of the column part 15a, and no flange is provided at the other end of the column part 15*a*. The flange part 15*b* is adhered to the surface material 3. The other end of the column part 15*a* does not reach the surface material 3, and extends to the middle part of the core material 12. Effects of strength improvement and noise suppression are achieved even in such a form.

6. Other Embodiments

A skin material may be provided to cover the core material 12 and the surface material 3 if necessary. This enables to improve the aesthetic appearance and to suppress delamination of the surface material 3 from the core material 12. In one example, the skin material is a nonwoven fabric, and can be adhered to the surface material 3 and the core material 12 via an adhesive layer.

(Fourth Perspective)

1. First Embodiment 1-1. Structure of Panel 1

As shown in FIGS. 10A to 10C, the panel 1 according to one embodiment of the present invention has the core material 12, the first surface material 3*a*, and the second surface material 3*b*. The core material 12 is interposed between the surface materials 3*a* and 3*b*. Preferably, the panel 1 has a substantially rectangular parallelepiped shape. The panel 1 can be used as a luggage board or the like installed in the luggage compartment of a vehicle.

The length of the panel 1 in the first direction is defined as L1, the length of the panel 1 in the second direction perpendicular to the first direction is defined as L2, and L1 is defined to be equal to or greater than L2. L1 is, for example, 600 to 1200 mm, specifically for example, 600, 700, 800, 900, 1000, 1100, or 1200 mm, and may be in the range between the two values exemplified herein. L2 is 300 to 1200 mm, specifically for example, 300, 400, 500, 600, 700, 800, 900, 1000, 1100, or 1200 mm, and may be in the range between the two values exemplified herein. The value of L2/L1 is, for example, 0.3 to 1, specifically for example, 0.3, 0.4, 0.5, 0.6, 0.7, 0.8, 0.9, or 1.0, and may be in the range between the two values exemplified herein.

The areal density of the panel 1 (mass per unit area) is preferably 3000 g/m$^2$ or lower from the viewpoint of reducing the weight of the panel 1. The areal density is, for example, 1500 to 3000 g/m$^2$, specifically for example, 1500, 1600, 1700, 1800, 1900, 2000, 2100, 2200, 2300, 2400, 2500, 2600, 2700, 2800, 2900, or 3000 g/m$^2$, and may be in the range between the two values exemplified herein.

The core material 12 is preferably a plate-shaped member. The thickness of the core material 12 is 15 to 25 mm, and preferably 18 to 22 mm. When the core material 12 is too thin, the overall deflection of the panel 1 is too large. On the other hand, when the core material 12 is too thick, the weight of the panel 1 is too large. The thickness is, specifically for example, 16, 17, 18, 19, 20, 21, 22, 23, 24, or 25 mm, and may be in the range between the two values exemplified herein. The thickness of the core material 12 represents a distance at a part where the distance between the first major surface 12*a* and the second major surface 12*b* of the core material 12 opposing to each other is the greatest. The core material 12 is preferably provided with a recessed part, and the surface materials 3*a* and 3*b* are fixed inside the recessed part. This suppresses delamination of the surface materials 3*a* and 3*b* from the core material 12.

Descriptions of the core material 12 are the same as those of the base material 2 in the first perspective, except for the matters described in this perspective.

The 10% compressive stress of the core material 12 is, for example, 0.1 to 1.0 MPa. When the value is too small, buckling deformation is likely to occur. When the value is too large, the weight of the panel 1 is likely to be excessive. The value is, specifically for example, 0.10, 0.15, 0.20, 0.25, 0.30, 0.35, 0.45, 0.50, 0.55, 0.60, 0.65, 0.70, 0.75, 0.80, 0.85, 0.90, or 1.00 MPa, and may be in the range between the two values exemplified herein. The 10% compressive stress of the core material 12 can be measured in accordance with JIS K 7220.

The areal density of the core material 12 is, for example, 400 to 1000 g/m$^2$, specifically for example, 400, 500, 600, 700, 800, 900, or 1000 g/m$^2$, and may be in the range between the two values exemplified herein.

The surface materials 3*a* and 3*b* are each a plate-shaped member and are adhered to the major surfaces 12*a* and 12*b* of the core material 12, respectively. The surface materials 3*a* and 3*b* can be configured of a material having rigidity per unit thickness higher than that of the core material 12. For example, they can be configured of a metal such as aluminum and iron, a fiber reinforced resin, or the like. Each of the thicknesses of the surface materials 3*a* and 3*b* is, for example, 0.05 to 1 mm, and preferably 0.08 to 0.5 mm. The thicknesses are, for example, 0.08, 0.10, 0.15, 0.20, 0.25, 0.30, 0.35, 0.40, 0.45, 0.50, 0.70, 0.80, 0.90, or 1.00 mm, and may be in the range between the two values exemplified herein. In the present specification, values such as thickness and depth represent average values, unless otherwise specified.

Each of the areal densities of the surface materials 3*a* and 3*b* is, for example, 400 to 1000 g/m$^2$, specifically for example, 400, 500, 600, 700, 800, 900, or 1000 g/m$^2$, and may be in the range between the two values exemplified herein.

The surface materials 3*a* and 3*b* can be adhered to the core material 12 via the adhesive layers 6*a* and 6*b*, respectively. Examples of the adhesive constituting the adhesive layers 6*a* and 6*b* include urethane-based adhesives and olefin-based adhesives, and a one-pack type urethane-based adhesive is preferred. Each of the thicknesses of the adhesive layers 6*a* and 6*b* is, for example, 0.01 to 0.5 mm, specifically for example, 0.01, 0.05, 0.2, 0.3, 0.4, or 0.5 mm, and may be in the range between the two values exemplified herein. Each of the areal densities of the adhesive layers 6*a* and 6*b* is, for example, 10 to 100 g/m$^2$, specifically for example, 10, 20, 30, 40, 50, 60, 70, 80, 90, or 100 g/m$^2$, and may be in the range between the two values exemplified herein.

If the first surface material strength index is defined by (the Young's modulus of the first surface material 3*a* [GPa])×(the thickness of the first surface material 3*a* [mm])$^2$, the second surface material strength index is defined by (the Young's modulus of the second surface material 3*b* [GPa])×(the thickness of the second surface material 3*b* [mm])$^2$, and the average surface material strength index is defined as the average value of the first surface material strength index and the second surface material strength index, the panel strength index defined by (the average surface material strength index)×(10% compressive stress of the core material [MPa]) is 0.7 or greater.

The surface material strength index represents the strength of the surface material 3*a* or 3*b*. Each of the first surface material strength index, the second surface material strength index, and the average surface material strength index is preferably 1.5 or greater, and more preferably 10 or less. When the value is too small, buckling deformation is likely to occur. When the value is too large, the weight of the panel 1 is likely to be excessive. The value is, specifically for example, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0, and may be in the range between the two values exemplified herein.

The panel strength index represents the strength correlated to the local strength in the panel 1. The panel strength index is 0.7 or greater, and preferably 5.0 or less. When the value is too small, buckling deformation is likely to occur. When the value is too large, the weight of the panel 1 is likely to be excessive. The value is, specifically for example, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0, and may be in the range between the two values exemplified herein.

materials 3a and 3b, and was applied such that the areal density is 60 g/m². In Examples and Comparative Examples in Table 1, the materials and thicknesses of the surface materials 3a and 3b were identical. Al5052 was used as Al, and SUS304 was used as SUS. The core material 12 manufactured with heat pole GR (made by JSP Corporation) was used.

A load was applied to the center of the panel 1 in the longitudinal direction by a pressing element whose contact surface is 50 mm in diameter in a state that two sides at both ends of the panel 1 in the longitudinal direction are supported. The load was increased by 10 kg and the buckling load was defined as the load when buckling deformation occurred. The results are shown in Table 1.

TABLE 1

| | | Examples | | | | Comparative Examples | | | |
|---|---|---|---|---|---|---|---|---|---|
| | | 1 | 2 | 3 | 4 | 1 | 2 | 3 | 4 |
| Surface Material | Material | Al | Al | Al | SUS | Al | SUS | SUS | SUS |
| | Young's Modulus [GPa] | 70 | 70 | 70 | 193 | 70 | 193 | 193 | 193 |
| | Thickness [mm] | 0.3 | 0.3 | 0.2 | 0.1 | 0.2 | 0.1 | 0.05 | 0.05 |
| Core Material | Foaming Rate [times] | 40 | 20 | 20 | 20 | 40 | 40 | 40 | 20 |
| | Thickness of Core Material [mm] | 20 | 20 | 20 | 20 | 20 | 20 | 20 | 20 |
| | 10% Compressive Stress [MPa] | 0.18 | 0.45 | 0.45 | 0.45 | 0.18 | 0.18 | 0.18 | 0.45 |
| Areal Density [g/m²] | | 2240 | 2740 | 2200 | 2700 | 1700 | 2200 | 1410 | 1910 |
| Average Surface Strength Index | | 6.3 | 6.3 | 2.8 | 1.9 | 2.8 | 1.9 | 0.5 | 0.5 |
| Panel Strength Index | | 1.1 | 2.8 | 1.3 | 0.9 | 0.5 | 0.3 | 0.1 | 0.2 |
| Buckling Load [kg] | | 60 | 100 | 70 | 60 | 30 | 20 | 20 | 30 |

The buckling load (minimum value of load that causes buckling deformation) when the load is applied to the center of the panel 1 in the first direction by a pressing element whose contact surface is 50 mm in diameter in a state that two sides at both ends of the panel 1 in the first direction are supported is preferably 40 kg or more and 300 kg or less. When the value is too small, buckling deformation is likely to occur. When the value is too large, the weight of the panel 1 is likely to be excessive. The value is, specifically for example, 40, 50, 60, 80, 90, 100, 150, 200, 250, or 300 kg, and may be in the range between the two values exemplified herein.

1-2. Manufacturing of Panel 1

The panel 1 can be manufactured by applying an adhesive onto the core material 12 (e.g., spray coating, bead coating) and then pressing the surface materials 3a and 3b against the core material 12.

2. Other Embodiments

A skin material may be provided to cover the core material 12 and the surface materials 3a and 3b if necessary. This enables to obtain the improved aesthetic appearance and suppresses delamination of the surface materials 3a and 3b from the core material 12. In one example, the skin material is a nonwoven fabric, and can be adhered to the surface material 3a, the surface material 3b, and the core material 12 via an adhesive layer.

Examples (Fourth Perspective)

The panel 1 with a flat shape of 1000 mm×450 mm was manufactured using the core material 12, the surface material 3a, and the surface material 3b shown in Table 1. A one-pack type urethane-based adhesive was used as the adhesive to adhere the core material 12 to the surface As shown in Table 1, in all Examples in which the panel strength index is 0.7 or greater, buckling deformation was less likely to occur.

REFERENCE SIGN LIST

1: panel, 1f: front surface, 1r: rear surface, 1s: side surface, 2: base material, 2a: side end, 2b: periphery, 2c: edge, 2d: protruding part, 2f: front surface, 2r: rear surface, 2s: side surface, 3: surface material, 3a: first surface material, 3b: second surface material, 3c: edge, 4: skin material, 5: recessed part, 5a: edge, 5c: bottom surface, 6: adhesive layer, 6a: adhesive layer, 6b: adhesive layer, 7: adhesive layer, 8: welded part, 12: core material, 12a: first major surface, 12b: second major surface, 14: base material, 15: reinforcing material, 15a: column part, 15b: flange part, 15c: flange part, 17: support member, 18: luggage, 21: front wall, 22: rear wall, 23: rib, 23a: opening, 31: resin sheet, 32: resin sheet, 41: mold, 41a: molding surface, 42: mold, 42a: molding surface, A: region, B: region, C: region, PL: parting line, T: thickness

The invention claimed is:

1. A panel comprising a base material and a surface material, wherein the surface material is fixed, via an adhesive layer composed of an adhesive, inside a recessed part provided on the base material,
   the base material is a bead foam molded body obtained by bead foam molding, or a foamed or non-foamed sheet molded body composed of a polyolefin and obtained by imparting an uneven shape to a single foamed or non-foamed resin sheet.

2. The panel of claim 1, wherein the base material and the surface material are covered with a skin material.

3. The panel of claim 1, wherein a width of a periphery between an edge of the recessed part and a side end of the base material is 1 to 20 mm.

4. The panel of claim 1, wherein S/T1 is 0.8 or less, where S represents a step difference between an edge of the recessed part and an edge of the surface material, and T1 represents a thickness of the surface material.

5. A panel comprising a core material and a surface material, wherein:

the core material comprises a base material and a reinforcing material, the reinforcing material is configured of a material having strength higher than that of the base material, each of the base material and the reinforcing material is adhered to the surface material, the reinforcing material comprises a column part and a flange part, the flange part is provided at one end or both ends of the column part, and the flange part is adhered to the surface material.

6. A panel comprising a core material, a first surface material, and a second surface material, wherein:

the core material is interposed between the first surface material and the second surface material, a thickness of the core material is 15 to 25 mm, the first surface material and the second surface material are adhered to the core material, a first surface material strength index is defined by (a Young's modulus of the first surface material [GPa])×(a thickness of the first surface material [mm])$^2$, a second surface material strength index is defined by (a Young's modulus of the second surface material [GPa])×(a thickness of the second surface material [mm])$^2$, an average surface material strength index is defined as an average value of the first surface material strength index and the second surface material strength index, and a panel strength index defined by (the average surface material strength index)×(10% compressive stress of the core material [MPa]) is 0.7 or greater.

7. The panel of claim 6, wherein the panel strength index is 5.0 or less.

8. The panel of claim 6, wherein an areal density of the panel is 3000 g/m$^2$ or lower.

9. The panel of claim 1, wherein the base material is a bead foam molded body obtained by bead foam molding.

10. The panel of claim 1, wherein the base material is a foamed sheet molded body composed of a polyolefin and obtained by imparting an uneven shape to a single foamed resin sheet.

11. The panel of claim 1, wherein the base material is a non-foamed sheet molded body composed of a polyolefin and obtained by imparting an uneven shape to a single non-foamed resin sheet.

\* \* \* \* \*